United States Patent [19]
Fujishima et al.

[11] 3,896,869

[45] July 29, 1975

[54] RADIAL PNEUMATIC TIRE HAVING A COMPENSATING CORD LAYER

[75] Inventors: Hiroyasu Fujishima; Kensei Aoe; Masahiro Ishigaki, all of Ibaraki, Japan

[73] Assignee: The Toyo Rubber Industry Co., Ltd., Osaka, Japan

[22] Filed: Nov. 15, 1973

[21] Appl. No.: 416,307

Related U.S. Application Data

[63] Continuation-in-part of Ser. No. 133,025, April 12, 1971, abandoned.

[30] Foreign Application Priority Data

Apr. 13, 1970  Japan.............................. 45-31698

[52] U.S. Cl...................... 152/361 DM; 152/361 R
[51] Int. Cl. ............................................... B60c 9/18
[58] Field of Search.... 152/361 R, 361 FP, 361 DM

[56] References Cited
UNITED STATES PATENTS

| | | | |
|---|---|---|---|
| 2,493,614 | 1/1950 | Bourdon ......................... | 152/361 R |
| 3,175,598 | 3/1965 | Cegnar............................ | 152/361 R |
| 3,515,197 | 6/1970 | Boileau .......................... | 152/361 R |

*Primary Examiner*—Drayton E. Hoffman
*Attorney, Agent, or Firm*—Sughrue, Rothwell, Mion, Zinn & Macpeak

[57] ABSTRACT

A pneumatic tire having a carcass comprising one or more rubber-coated cord layers intersecting the equator line of the tire at an angle of 60° to 90° is provided with an even number of low extensible or inextensible rubber-coated cord layers disposed adjacent to the carcass and beneath the tire tread. The low extensible or inextensible cord layers each intersect the equator line of the tire at a constant angle and also intersect one another. An additional compensating rubber-coated low extensible cord layer intersecting the equator line at a constant angle and the adjacent cord layer at an opposite direction to the adjacent cord layer is interposed between the carcass and the even number of cord layers to compensate for any lateral deviating force.

3 Claims, 9 Drawing Figures

INVENTOR
HIROYASU FUJISHIMA, KENSEI AOE,
MASAHIRO ISHIGAKI
BY Sughrue, Rothwell, Mion, Zinn & Macpeak
ATTORNEYS (b)

3,896,869

RADIAL PNEUMATIC TIRE HAVING A COMPENSATING CORD LAYER

CROSS REFERENCE TO RELATED APPLICATION

This is a Continuation-in-Part of U.S. application Ser. No. 133,025 filed Apr. 12, 1971 now abandoned, which claims priority from Apr. 13, 1970 based on Japanese application Ser. No. 31698/70.

BACKGROUND OF THE INVENTION

1. Field of the Invention

The present invention relates to a pneumatic tire that incorporates a belt layer of cord having improved structure. Specifically, the pneumatic tire of the present invention compensates for the lateral deviating force which is normally encountered in the use of radial or semi-radial tires.

2. Description of the Prior Art

The combination of high powered automobiles and the construction of modernized roads has permitted automobiles to travel at higher rates of speed, and consequently there has been an increasing demand for pneumatic tires which exhibit appropriate performance characteristics to permit safe high speed driving. A recent trend has been the use of radial tires, instead of the conventional bias tires.

The radial or semi-radial tire generally comprises a carcass of one or more reinforcing cord layers coated with rubber and arranged to intersect the equator line of the tire at an angle of 60° to 90°. A belt layer having relatively high rigidity is generally disposed beneath the tread. The belt layer generally comprises a plurality of rubber-coated cord layers which have no extensibility or have low extensibility. The direction of the arrangement of the cord layers is intersecting with the equator line of the tire generally at small angles between 10° and 25°. These radial or semi-radial tires have far superior driving performance with respect to rolling, braking, or cornering capabilities and also superior abrasive resistance when compared to those of the conventional bias tire. However, these tires have many problems due to the complexity and uniqueness of these structures and particularly to the effect of the structure of the belt layer. A phenomenon known as a lateral deviating force is generated in these tires and causes the vehicle to deviate from its straight course. By the term "lateral deviating force" as used herein, it is meant a force which is generated in the lateral direction on either side of the car during the rotation of these tires. Thus, an automobile utilizing these tires will often experience a force tending to move the automobile in a lateral deviating direction, contrary to the driver's intended direction. Obviously, this can be a very dangerous phenomenon. In many cases, the lateral deviating force occurring with the use of these tires can be 10 or more times as great as that which would occur with the conventional bias tire and obviously, this poses a serious problem in safe driving and utilization of the other advantages of these tires.

SUMMARY OF THE INVENTION

An analysis of the problems associated with the radial or semi-radial tires indicates that the lateral deviating force can be broken up into two components; one component that is related to the geometrical symmetry of the tire with respect to its equator line, and the other component relating to the force generated during the rotation of the tire and derived from the structure of the belt layer itself. The present invention compensates for this second component of force by providing an additional compensating low extensible rubber-coated layer, which is interposed between the carcass and the belt layers and has a suitable intersecting angle to the equator line of the tire which compensates for the deviating force generated in the belt layer.

DESCRIPTION OF THE PREFERRED EMBODIMENT

Figure 1:
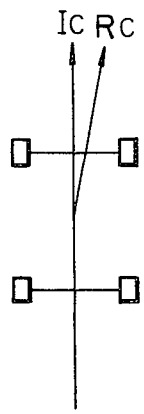
FIG. 1 is a graphic representation showing the drifting direction of an automobile due to the generation of a lateral deviating force.

As mentioned above, the term lateral deviating force refers to the force which is generated in a lateral direction on either side of the direction in which the auto is traveling. Referring to FIG. 1, the intended direction of travel of the automobile is along the direction IC, but that a deviating force will tend to move the automobile in the direction RC.

Figure 2:
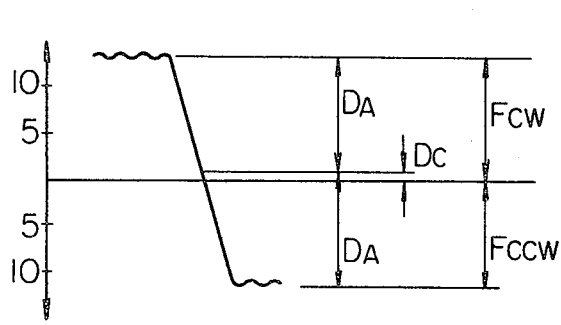
FIG. 2 is a graphic representation showing the measurement of the lateral force variation of the conventional radial tire.

FIG. 2 discloses the measurement of the lateral force variation of the conventional radial tires. The deviating force is measured in one normal rotation of the tire and in one reverse rotation of the tire. The normal rotation refers to a rotation in the clockwise direction and the reverse rotation to a rotation in the counterclockwise direction, both on the basis of a specific side of the tire.

Referring to the drawing, $Fcw$ is a mean lateral deviating force which occurs during the clokwise rotation of the tire; $Fccw$, a mean lateral deviating force generated during the counterclockwise rotation; $D_C$, a force not relevant to the direction of rotation; and $D_A$, a force relevant to the structure of the belt layer. Then, the following relation holds good.

$Fcw = D_C + D_A$
$Fccw = D_C - D_A$

Hence, in order to compensate for the lateral deviating force of the radial tire, both $D_C$ and $D_A$ must be decreased simultaneously. The force $D_C$ which is not relevant to the direction of rotation depends upon whether the tire has a geometrical symmetry with respect to its equator line, and has to do with the manufacture of the tire. It is possible that the symmetry can readily be attained and force $D_C$ reduced by improving the manufacturing machine and training the worker.

Figure 3:
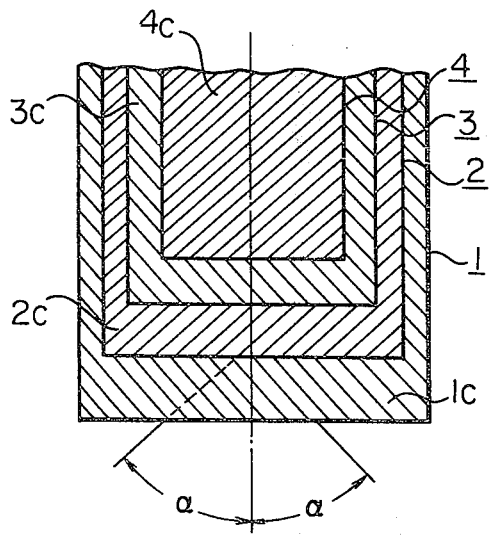
FIG. 3 is a view illustrating the structure of the belt layer of the conventional radial tire.

The component $D_A$, i.e. the force relating to the direction of the rotation, is derived from the structure of the belt layer itself. As shown in FIG. 3, the belt layer of the conventional radial tire has a construction such that the direction of each cord 1C, 2C, 3C or 4C of each cord layer 1, 2, 3, or 4 respectively intersects the equator line of the tire at the same angle $\alpha$, and also intersects the cord of the adjoining cord layer of layers. Therefore, the tire is geometrically symmetrical with respect to the equator line. One tends to think that the geometrical symmetry means a dynamical symmetry. This, however, is not true of radial tires, and such thought often becomes a cause of the generation of lateral deviating force when designing radial tires.

The behavior of the belt structure will first be considered in investigating the generation of the lateral deviating force.

Figure 4:
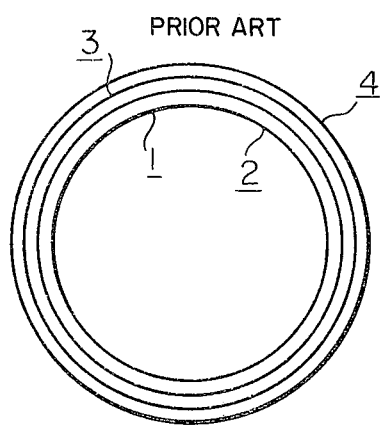
FIG. 4 is a sectional view of the belt layer of the conventional radial tire cut in parallel with the equator line of the tire.
Figure 5:
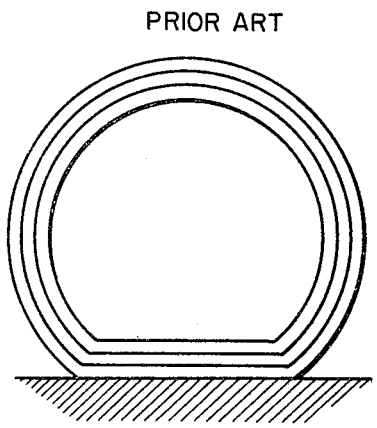
FIG. 5 is a view showing the distorted state under a load of the belt layer shown in FIG. 4.
Figure 6:
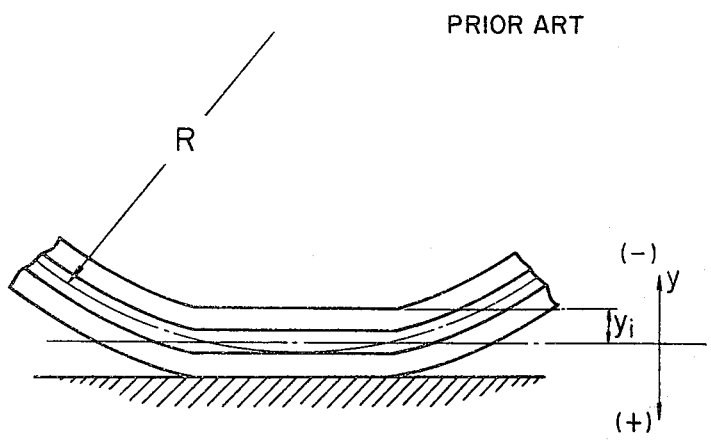
FIG. 6 is a view illustrating the distorted state of the belt structure near the ground-contacting area.

FIG. 4 illustrates the section of the belt layer of the tire cut in parallel with the equator line. When placed under a load, this belt layer partly forms a plane which is parallel with the road surface, as shown in FIG. 5. In the process of such a distortion, the stress of each of the cord layers under a load will become roughly as follows with reference to the symbols shown in FIG. 6.

Figure 7:
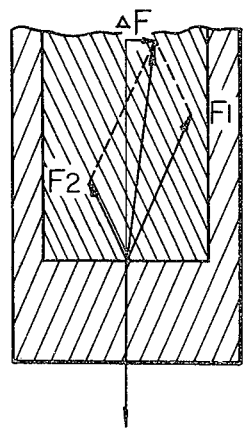
FIG. 7 is a view illustrating the generation of the lateral deviating force.

The stress ($\delta i$) of each cord layer under load is expressed by the following equation.

$$\delta i = \frac{yi}{R} Ei$$

wherein
$i$ is 1 to $n$, $n$ being the number of cord layers;
$yi$ is the distance between each cord layer and the neutral plane of the belt layer;
$Ei$ is the modulus of elasticity of each cord layer in the direction of the equator line of the tire; and
$R$ is the radius of rotation from the axis of rotation of the tire to the neutral plane of the tire before distortion;

Since the foregoing equation indicates that $\delta i$ is mostly borne by the cords, the stress $Si$ of the tire in the cord direction will be $Si = \delta i/\cos^2\alpha$, wherein $\alpha$ is the angle of intersection between the equator line and the cord. It follows from the foregoing that in a belt structure consisting of $2n$ cord layers, that is consisting of an even number of cord layers, the following relation is established (see FIG. 7).

$F_1 = (S_1 + \ldots + S_{2n-1}) \times W$
$F_2 = (S_2 + \ldots + C_{2n}) \times W$
(where $W$ is the width of the cord layer)
Therefore $\Delta F = (F_1 - F_2) \times \sin\alpha$ $\Delta F$ is the resultant deviation force generated. Consequently, the above equation proves that in the conventional radial tire whose belt layer consists of the even number of cord layers, the generation of a lateral deviating force cannot be avoided.

In order to improve the belt structure of a radial tire in which the generation of lateral deviating force has been previously considered unavoidable, the present invention provides a pneumatic tire in which an additional cord layer that is cut at a suitable angle is interposed between the carcass and the belt layers and has an intersecting angle to the equator line of the tire in a direction opposite to the adjacent belt layer. This arrangement ensures a complete freedom from lateral force deviation during the rotation of the tire.

If the stress of the additional compensating cord layer in the cord direction is $Sc$, then $F_1$ and $F_2$ in the pneumatic tire of the invention will be as follows:

$F_1 = (S_1 + S_3) \times W$
$F_2 = (S_2 + S_4) \times W + Sc \times W$
Therefore $\Delta F = F_1 - F_2 = 0$ The angle of the additional cord layer is determined so that $\Delta F$ will become 0. Accordingly, the angle of the additional cord layer to the equator line of the tire differs according to the modulus of elasticity of the cord used and the covering rubber.

Figure 8:
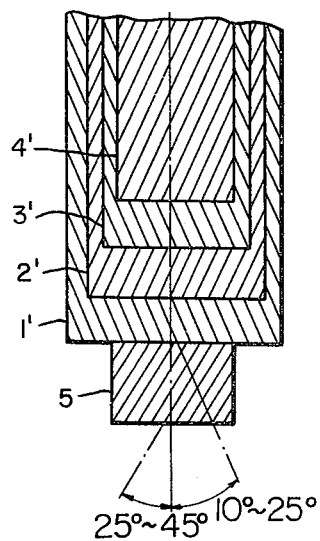
FIGS. 8(a) and (b) are views showing the structures of the belt layer of the pneumatic tire of the invention.

A belt structure as shown in FIG. 8(a) consists of four rubber-coated low extensible cord (for example, rayon, nylon, polyester, Vinylon, etc.) layers 1', 2', 3' and 4', having a modulus of elasticity of 400 to 2,000 Kg/mm², and each layer intersecting the equator line of the tire at an angle of 10° to 25°, preferably 12° to 18°. Between the carcass and the belt layers adjacent thereto was interposed an additional compensating rubber-coated layer 10, 20 comprised of low extensible cord having a modulus of elasticity of 400 to 2,000 Kg/mm², and intersecting the equator line at an angle of 25° to less than 45°, preferably 30° to 40°. The above additional cord layer intersects the equator line at an angle of 25° to less than 45° and at an opposite direction to the adjacent belt cord layer. The angle of the additional layer intersecting the equator line of the tire is at least 5° larger than that of the low extensible cord layers.

A belt structure as shown in FIG. 8(b) consists of two rubber-coated in-extensible cord (for example, steel or glass fiber) layers 10, 20 having a modulus of elasticity of 3,000 to 20,000 Kg/mm², and each intersecting the equator line at an angle of 15° to 35°, preferably 15° to 25°. Between the carcass and the belt layers adjacent thereto is interposed an additional rubber-coated layer 30 comprised of low extensible cord having a modulus of elasticity of 400 to 2,000 Kg/mm² and intersecting the equator line at an angle of 10° to 30°, preferably 10° to 20°.

The above additional cord layer intersects the equator line at an angle of 10° to 30° and at an opposite direction to the adjacent belt cord layer. The angle of the additional layer intersecting the equator line of the tire is at least 5° smaller than that of the in-extensible cord layers.

The tires of the structures illustrated in FIG. 8(a) and (b) above are effective for removing the lateral deviating force that plagues conventional radial tires.

Figure 9:
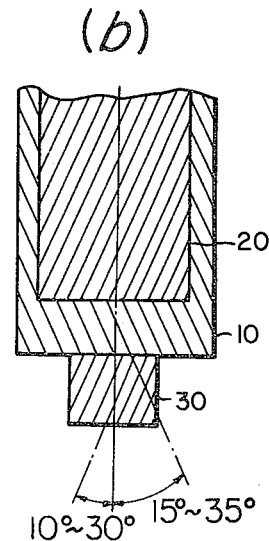
FIG. 9 is a graphic representation showing the measurement of lateral force variation of the pneumatic tire of the invention.
Figure 9:
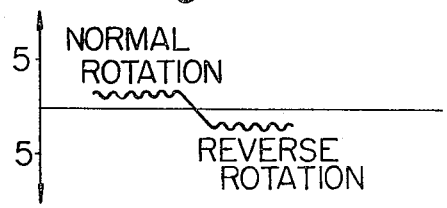

FIG. 9 shows the measurement of lateral force variation in the pneumatic tire of the present invention. It can be seen from a comparison of FIG. 9 with the conventional example shown in FIG. 2 that the pneumatic tire of the invention is far superior.

The experimental test results shown in Table 1 demonstrate that by interposing an additional compensating cord layer according to the present invention, Tire B and Tire G achieve the desired results of lowering the deviating force. The lateral deviating force measurement conditions are as follows:

| | |
|---|---|
| Tire size | 175R14 |
| Load | 475 Kg (1,050 lbs) |
| Inner pressure of tire | 1.7 Kg/cm² (24 PSi) |
| Number of tires tested | 10 |

-Continued
Modulus of Elasticity of materials used in
belt layers and an additional layer:
   Rayon cord:      830 Kg/mm²
   Steel cord:    16,770 Kg/mm²

Tires A, B, C and D have the same belt structure consisting of four rayon cord layers, respectively, and have an additional rayon cord layer with the exception that the additional layer is removed from Tire D. Tire B interposing an additional rayon cord layer, between the carcass and the belt cord layers, at an angle of 35° to the equator line of the tire reduces the deviating force substantially.

Similarly, Tires F, G, H, I and J have the same belt structure consisting of two steel cord layers respectively, and Tires F, G and I have an additional rayon cord layer, respectively, Tire G interposing an additional rayon cord layer, between the carcass and the belt cord layers, at an angle of 13° to the equator line of the tire, reduces the deviating force substantially. Tire E interposing an additional steel cord layer at an angle of 60° to the equator line of the tire generates a large deviating force. By reducing this angle to 13°, the deviating force value of Tire H is reduced to about 40% of that of Tire E, but is fairly larger than that of Tire G, and is almost the same as that of Tire J having no additional layer. Therefore, the additional steel cord layer has little effect in compensating the deviating force.

Another advantage of the pneumatic tire of the present invention is that an increase in the dynamic stability of the belt structure obtained as a result of the efforts made in an attempt to reduce the lateral deviating force, and therefore, the high speed durability of the tire is markedly improved. Furthermore, since the state of stress is symmetrical with respect to the equator line of the tire, the occurrence of abnormal wear can be reduced. Thus, in the pneumatic tire of the present invention, a marked improvement in durability is attained together with freedom from the lateral deviating force that is generated in the conventional radial tire.

Various modifications within the scope of the present invention can be made by skilled craftsman and accordingly, the scope of the present invention should be found only in the following claims.

What is claimed is:

1. A pneumatic tire having a tread comprising a carcass having at least one rubber-coated cord layer intersecting the equator line of the tire at an angle of 60° to 90°, two rubber-coated inextensible belt cord layers adjacent to the carcass and beneath the tire tread intersecting the equator line of the tire at an angle of 15° to 35° and arranged symmetrically with respect to the equator line of the tire in opposite directions with respect to each other, and means for compensating for lateral deviating forces including a single additional rubber-coated low extensible cord layer interposed between said carcass and said inextensible belt cord layers, said additional layer intersecting the equator line of the tire at an angle of 10° to 30° and at an opposite direction to the adjacent layer of said inextensible belt cord layers, and said angle of said additional layer is at least 5° smaller than said angle of said inextensible belt cord layers.

2. The pneumatic tire as in claim 1, wherein said two inextensible belt cord layers intersect said equator line at an angle of 15° to 25° and wherein said additional low extensible cord layer intersects said equator line at an angle of 10° to 20°.

3. A peumatic tire as in claim 1, wherein the cord material of said inextensible belt cord layers has a modulus of elasticity of 3,000 to 20,000 Kg/mm², and the cord material of said additional layer has a modulus of elasticity of 400 and 2,000 Kg/mm².

Table 1

| Tire | Belt Cord Material | No. of Belt Cord Layers | Angle of Belt Cord Layers to Equator Line of the Tire | Material of Additional Layer between Carcass and Belt Cord Layers | Angle of Additional Layer to Equator Line of the Tire | Lateral Deviating Force |
|---|---|---|---|---|---|---|
| A | Rayon | 4 | 16° | Rayon | 50° | 10 – 15 Kg |
| B* | Rayon | 4 | 16° | Rayon | 35° | 0 – 5 Kg |
| C | Rayon | 4 | 16° | Rayon | 16° | 8 – 13 Kg |
| D | Rayon | 4 | 16° | — | — | 15 – 20 Kg |
| E | Steel | 2 | 20° | Steel | 60° | 40 – 45 Kg |
| F | Steel | 2 | 20° | Rayon | 20° | 10 – 17 Kg |
| G* | Steel | 2 | 20° | Rayon | 13° | 3 – 7 Kg |
| H | Steel | 2 | 20° | Steel | 13° | 15 – 20 Kg |
| I | Steel | 2 | 20° | Rayon | 5° | 10 – 15 Kg |
| J | Steel | 2 | 20° | — | — | 15 – 20 Kg |